(12) United States Patent
Chen et al.

(10) Patent No.: US 8,432,449 B2
(45) Date of Patent: Apr. 30, 2013

(54) HIDDEN MARKOV MODEL FOR CAMERA HANDOFF

(75) Inventors: Francine R. Chen, Menlo Park, CA (US); Tao Yang, Xi'an (CN); Donald G. Kimber, Foster City, CA (US)

(73) Assignee: Fuji Xerox Co., Ltd., Tokyo (JP)

( * ) Notice: Subject to any disclaimer, the term of this patent is extended or adjusted under 35 U.S.C. 154(b) by 1322 days.

(21) Appl. No.: 11/838,074

(22) Filed: Aug. 13, 2007

(65) Prior Publication Data

US 2009/0046153 A1 Feb. 19, 2009

(51) Int. Cl.
- H04N 7/18 (2006.01)
- H04N 5/225 (2006.01)
- G06K 9/00 (2006.01)
- G06K 9/62 (2006.01)
- G06K 9/34 (2006.01)

(52) U.S. Cl.
USPC ........... 348/159; 348/143; 348/169; 348/722; 382/103; 382/115; 382/116; 382/118; 382/173

(58) Field of Classification Search .................. None
See application file for complete search history.

(56) References Cited

U.S. PATENT DOCUMENTS

| | | | | | |
|---|---|---|---|---|---|
| 4,940,925 | A | * | 7/1990 | Wand et al. | 318/587 |
| 6,072,542 | A | * | 6/2000 | Wilcox et al. | 348/722 |
| 6,437,819 | B1 | * | 8/2002 | Loveland | 348/143 |
| 7,720,257 | B2 | * | 5/2010 | Morellas et al. | 382/103 |
| 7,817,822 | B2 | * | 10/2010 | Sun et al. | 382/103 |
| 7,930,204 | B1 | * | 4/2011 | Sharma et al. | 705/7.31 |
| 2003/0039379 | A1 | * | 2/2003 | Gutta et al. | 382/116 |
| 2003/0052971 | A1 | * | 3/2003 | Gutta et al. | 348/159 |
| 2003/0058111 | A1 | * | 3/2003 | Lee et al. | 340/573.1 |
| 2003/0058340 | A1 | * | 3/2003 | Lin et al. | 348/159 |
| 2003/0123702 | A1 | * | 7/2003 | Colmenarez et al. | 382/103 |
| 2003/0208289 | A1 | * | 11/2003 | Ben-Arie | 700/61 |
| 2004/0071317 | A1 | * | 4/2004 | Pavlovie et al. | 382/103 |
| 2004/0113933 | A1 | * | 6/2004 | Guler | 345/716 |
| 2004/0120554 | A1 | * | 6/2004 | Lin et al. | 382/118 |
| 2004/0156530 | A1 | * | 8/2004 | Brodsky et al. | 382/103 |
| 2004/0228530 | A1 | * | 11/2004 | Schwartz et al. | 382/173 |
| 2005/0047646 | A1 | * | 3/2005 | Jojic et al. | 382/159 |
| 2005/0086027 | A1 | * | 4/2005 | Li | 702/181 |
| 2005/0114092 | A1 | * | 5/2005 | Li | 702/189 |
| 2005/0114907 | A1 | * | 5/2005 | Li | 725/135 |
| 2005/0131869 | A1 | * | 6/2005 | Xie et al. | 707/3 |
| 2005/0210103 | A1 | * | 9/2005 | Rui et al. | 709/204 |

(Continued)

OTHER PUBLICATIONS

Chang, T., et al., "Tracking Multiple People with a Multi-Camera System," Proc. IEEE Workshop on Multi-Object Tracking, with ICCV '01, Jul. 2001.

(Continued)

Primary Examiner — Moustafa M Meky
Assistant Examiner — Ho Shiu
(74) Attorney, Agent, or Firm — Morgan, Lewis & Bockius LLP

(57) ABSTRACT

An integrated method for modeling the handoff between cameras for tracking a specific individual, including: creating a representation of overlaps, gaps, and allowable movement among the fields of view of the cameras, wherein the representation is modeled as states in a Hidden Markov Model (HMM); training the HMM using video of people walking through the fields of view of the cameras; selecting a person to be tracked; and identifying the best camera area using the HMM.

27 Claims, 3 Drawing Sheets

U.S. PATENT DOCUMENTS

| | | | |
|---|---|---|---|
| 2005/0288911 A1* | 12/2005 | Porikli | 703/2 |
| 2006/0018516 A1* | 1/2006 | Masoud et al. | 382/115 |
| 2006/0103731 A1* | 5/2006 | Pilu et al. | 348/207.99 |
| 2006/0120564 A1* | 6/2006 | Imagawa et al. | 382/103 |
| 2006/0187305 A1* | 8/2006 | Trivedi et al. | 348/169 |
| 2006/0204060 A1* | 9/2006 | Huang et al. | 382/118 |
| 2008/0071721 A1* | 3/2008 | Wang et al. | 706/48 |
| 2008/0138029 A1* | 6/2008 | Xu et al. | 386/46 |
| 2008/0159592 A1* | 7/2008 | Lin et al. | 382/103 |
| 2009/0096871 A1* | 4/2009 | Kuwano et al. | 348/169 |
| 2010/0002082 A1* | 1/2010 | Buehler et al. | 348/159 |
| 2010/0153321 A1* | 6/2010 | Savvides et al. | 706/13 |

OTHER PUBLICATIONS

Han, M., et al., "An Algorithm for Multiple Object Trajectory Tracking," Proc. Computer Vision and Pattern Recognition (CVPR 2004), vol. 1, pp. 864-871.

Kang, J., et al., "Continuous tracking within and across camera streams," Proc. Computer Vision and Pattern Recognition (CVPR 2003), vol. 1, pp. 267-272, Jun. 18-20, 2003.

Kang, J., et al., "Multi-Views Tracking Within and Across Uncalibrated Camera Streams," $1^{st}$ ACM International Workshop Video Surveillance, Berkeley, CA, Nov. 2003.

Kettnaker, V., et al., "Bayesian Multi-camera Surveillance," CVPR 1999.

Khan, S., et al., "Consistent Labeling of Tracked Objects in Multiple Cameras with Overlapping Fields of View," IEEE Transactions on Pattern Analysis and Machine Intelligence, vol. 25, No. 10, pp. 1355-1360, Oct. 2003.

Oliver, N., et al., "A Bayesian Computer Vision System for Modeling Human Interactions," IEEE Transactions on Pattern Analysis and Machine Intelligence, vol. 22, No. 8, pp. 1-14, Aug. 2000.

Rabiner, L., "A Tutorial on Hidden Markov Models and Selected Applications in Speech Recognition," Proceedings of the IEEE, vol. 77, No. 2, pp. 257-286, Feb. 1989.

Sidenblach, H., et al., "Stochastic Tracking of 3D Human Figures Using 2D Image Motion," ECCV, LNCS 1843, pp. 702-718, 2000.

Sigal, L., et al., "Tracking Loose-Limbed People," CVPR 2004, pp. 421-428.

* cited by examiner

HIDDEN MARKOV MODEL FOR CAMERA HANDOFF

BACKGROUND OF THE INVENTION

1. Field of the Invention

This invention is related to the surveillance of a person or a moving object across multiple cameras.

2. Description of the Related Art

Surveillance has traditionally been a highly labor-intensive task, requiring people to monitor banks of cameras. Methods for automating the surveillance task, including identifying interesting events, are being developed. Another surveillance task that can be automated is the task of tracking one particular object, a VIP (e.g., an important visitor, or a suspicious person), or a moving object who has been identified by a user. The VIP or moving object moves from one camera view to another and may also move out of camera view, either for a short time due to a gap in coverage, or for a longer period, such as moving into an unmonitored room. One of the primary ways in which the VIP tracking task differs from the most common tracking tasks is that there are multiple cameras where handoff between cameras occurs. The task of camera handoff when tracking objects has a number of difficulties associated with it, including occlusion, gaps in coverage, and noise in the extracted features. Most current methods, such as a Kalman filter, perform a locally optimal classification at each time or video frame.

A number of approaches have been developed to address various aspects of tracking across multiple cameras. These include matching features using a Kalman filter, a Bayesian formulation with a Markov model (but not a hidden Markov model) for transition probabilities, and using a Bayesian Network. Other approaches track objects across multiple cameras by developing models for a set of fixed, uncalibrated cameras that identify the corresponding field of view in overlapping cameras. Another approach uses a ground plane homography (corresponding points between two cameras) to register cameras.

Hidden Markov Models (HMM) have been used for tracking simple targets, where the state sequence indicates the trajectories (location, velocity, appearance, scale) of the objects. HMMs have also been used to model how two agents interact by specifically creating features that are a function of the two agents. HMMs have also been used for tracking human poses, but not for using states that are related to camera views.

SUMMARY OF THE INVENTION

The present invention provides an HMM framework to address the task of using layout information when handing off between cameras when tracking a person or a moving object. One embodiment of the invention is an integrated method for modeling the handoff between cameras for tracking a specific individual or moving object, including: creating a representation of overlaps, gaps, and allowable movement among the fields of view of the cameras, wherein the representation is modeled as states in an HMM; training the HMM using video of people walking through the fields of view of the cameras; selecting a person to be tracked; and identifying the best camera area using the HMM.

BRIEF DESCRIPTION OF THE DRAWINGS

Preferred embodiments of the present invention will be described in detail based on the following figures, wherein.

DETAILED DESCRIPTION OF THE INVENTION

Embodiments of this invention use an HMM framework to address the task of using layout information when handing off between cameras when tracking a person or a moving object, i.e., VIP tracking. The information is obtained from the floor layout and examination of the view from each camera. "Hotspots" correspond to areas in the camera view where an object can move from one camera to another camera or disappear into an unmonitored area, such as a room, corresponding to the states of an HMM. The HMM provides a framework for specifying the relation of the hotspots and for modeling the values and variations of features to be expected in different parts of the camera views. In addition, local differences can be handled in the transition probabilities.

The present invention assumes that tracking within each camera has been performed using one of the many single camera tracking methods known in the art. The regions corresponding to tracked persons then are made available to the invention to track a VIP across different cameras. The invention is based on the HMM framework. An HMM is characterized by a network of states, observation probabilities associated with the states, and transition probabilities. A set of exemplars is used to train the parameters of the HMM. When given test data, the best path through the network of states can be identified using the Viterbi algorithm. See Rabiner, Lawrence R., "A Tutorial on Hidden Markov Models and Selected Applications in Speech Recognition," *Proceedings of the IEEE*, Vol. 77, No. 2, pp. 257-286, February, 1989.

The HMM framework is used for representation of the floor layout as viewed through cameras as discrete areas, where a camera view area is represented by a state. Each area corresponds to either a "hotspot" where a person can appear or disappear in view of one camera, an area not covered by a hotspot that is in view of one camera, or an area not in view of any camera. The state sequence indicates the camera areas where a VIP may be viewed, and can directly identify cameras for viewing the VIP. Exact specification of the overlapping field of view is not needed. A set of rules can be created for specifying how the handoff may occur between cameras. The HMM framework specifies where handoffs may occur and learns the expected values when the handoffs occur.

Figure 1:
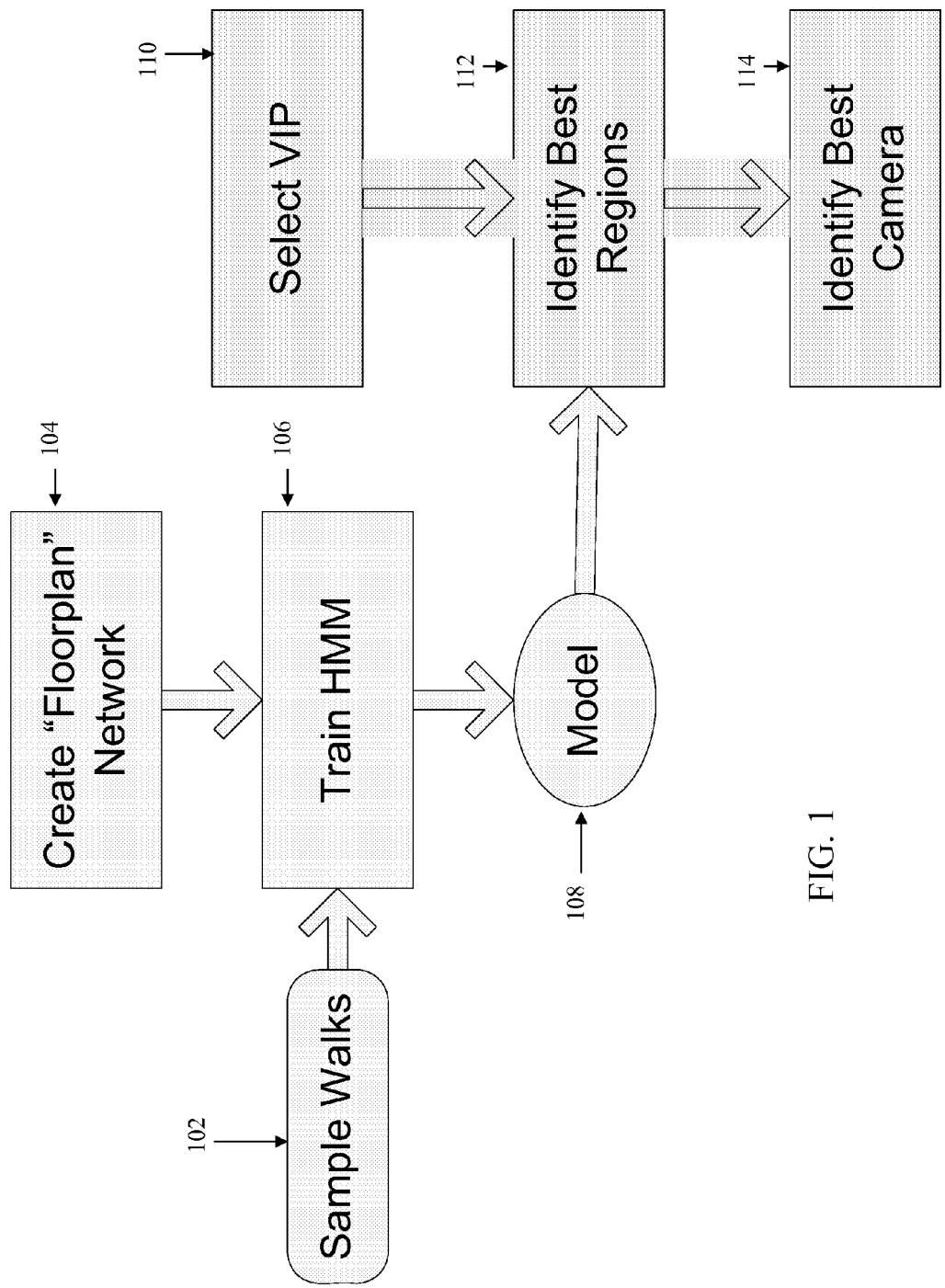
FIG. 1 is a flowchart describing how one embodiment of the invention can be trained and can identify the best camera for tracking a VIP.

An overview of one embodiment of the invention is shown in FIG. 1. A user creates a "Floor plan" network 104 showing allowable movement among fields of views in a set of cameras. Video clips of people walking around 102 that are labeled with the camera area are used to train an HMM model 106, resulting in the trained model 108.

Once the system has been trained to recognize specific people entering and leaving hot spots, then it can be used for tracking. To use this embodiment of the invention, a user would select the VIP 110 to be tracked in a video. Based on the trained HMM model 108, the embodiment of the invention identifies the best camera area 112 at each time sample. From the camera areas, the best camera 114 at each time is identified.

Figure 2:
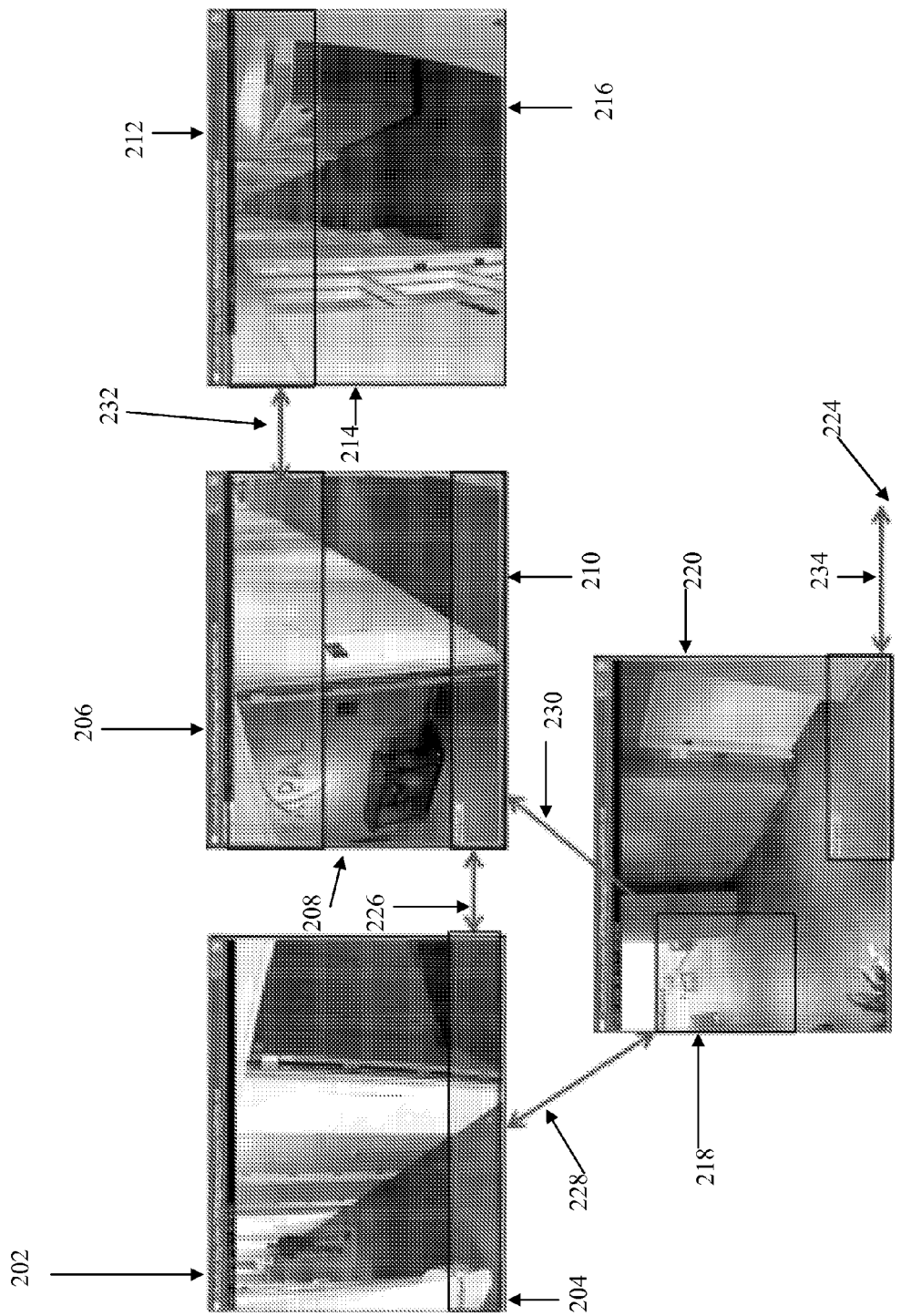
FIG. 2 shows an embodiment of the invention with four camera views, a VIP in the first camera view, several green hot spots, and red arrows showing the transitions between hot spots from one camera view to the next camera view.

FIG. 2 shows an example of how the invention might be used with four camera views. A person (VIP) 202 is in the first camera view. There are several grayed-out hot spots, 204, 206, 210, 212, 218, and 222. Large arrows 226, 228, 230, 232, and 234 show the transitions between hot spots from one camera view to the next camera view. The VIP can move from his starting position 202 to the hot spot 204. From the hotspot 204, the VIP can move to areas covered by other camera views, either hotspot 210 or hotspot 218. If the VIP moved to hotspot 218, the VIP could then move through non-hotspot 220 to hotspot 222. From hotspot 222, the VIP could move to an area not covered by any camera view 224.

Figure 3:
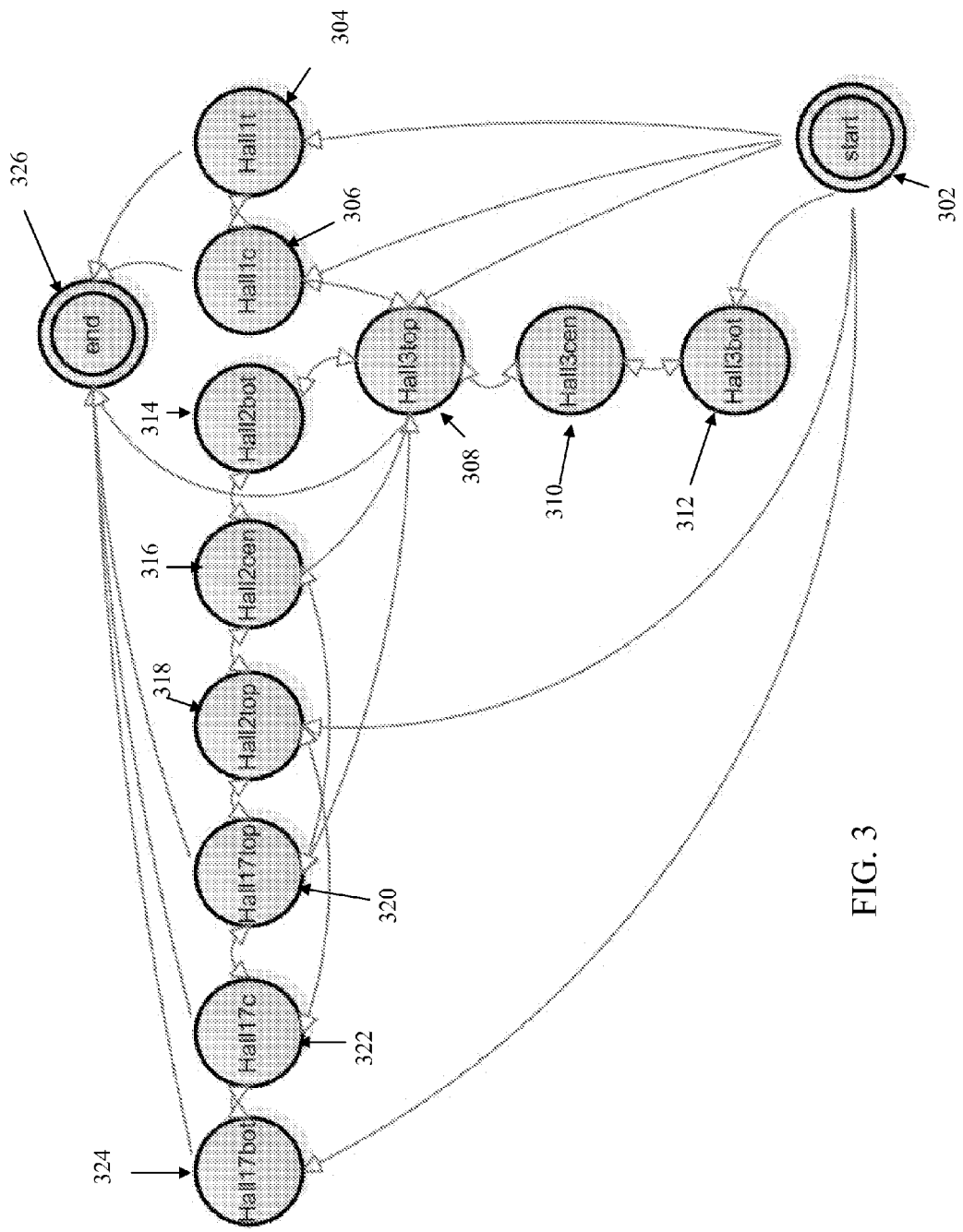
FIG. 3 shows an HMM representation of the embodiment of FIG. 2.

The corresponding HMM network for the elevator view is shown in FIG. 3. Note that two additional states representing the restrooms and the elevator are added to allow for modeling "blind" regions. In FIG. 3, each state, 304 through 324, represents a portion of the view from one camera (a camera area), with 302 representing the starting state and 326 representing the end state. Arcs between states represent the physically allowable movement between floor areas. Each state also has a self-transition which is not shown in FIG. 3. Each of the states shown in FIG. 3 corresponds to one portion of a camera view in FIG. 2. Hall1t 304 represents the location of the VIP 202, Hall1c 306 is the hotspot 204, Hall2bot 314 is the hotspot 210, Hall2cen 316 is 208, Hall2top is 206, Hall3t 308 is the hotspot 218, Hall3cen 310 is 220, Hall3bot is the hotspot 222, Hall17bot 324 is 216, Hall17c 322 is 214, and Hall17top 320 is the hotspot 212.

When training the model, the data is labeled with the state that the tracked person is in. The system then trains each state using the data labeled as that state. Once the individual states are trained, a few iterations of a version of training that updates the observation model and trains the transition probabilities between states could be performed using the labeled training data. One embodiment does not perform the last step, but sets the transition probabilities to be equally likely for the transitions exiting a state.

When the person is not in view, one embodiment treats it the same as when the person is in view; that is, the state is trained representing when a person is not in view with the data labeled for that state. An alternative embodiment represents it as a null state.

Once a model has been trained, the model can be used to identify the region in a camera view where the tracked person can be seen. A side result is the identification of the best camera view for tracking an identified person. A user specifies the person to be tracked by identifying the person (perhaps by clicking on a region bounding box around the VIP) in at least one frame of the interface. An appearance-based model of the person is created that will be used during feature generation. As new data is observed, candidate objects are identified in the image, and features characterizing the candidate objects are computed. For example, each of the objects in each camera area is compared to the reference appearance-based model, and the similarity computed. Another feature is the overlap of the region outlining the object with the camera area. In one embodiment, the most similar region in each camera area at each time is selected. The amount of overlap and similarity features can be computed at each time sample independently of the identity of the best camera area for viewing the VIP. The use of similarity as a feature obviates the need for training the HMM observation model for each new person to be tracked.

In one embodiment, the observations are based on two types of features: 1) the similarity of the most similar person who is at least in some portion of the region of the camera view corresponding to each state, and 2) the amount of overlap between the bounding box representing the tracked person and the portion of the camera view corresponding to each state. That is, the observation probability at state j with value x, $b_j(x)$, is represented as: $b_j(x) = \mathcal{N}[x, \mu_j, U_j]$, where $\mathcal{N}$ is the normal distribution, $\mu_j$ is the mean vector and $U_j$ is the covariance matrix associated with state j. The mean vector has two components: the first is the average similarity when the VIP is in state j, and the second is the average amount of overlap when the VIP is in state j.

For the first feature, there may be more than one person in the relevant portion of the camera view. One embodiment selects the similarity with the highest value. An alternative embodiment combines the similarity with other features, such as amount of overlap, or direction or speed. The feature vector that is given to the system is a concatenation of the features from each camera. If there are N cameras, then there are 2N features. One embodiment uses a Gaussian model with a diagonal covariance to model the observations, or features, to keep the amount of labeled training data needed to a minimum. In another embodiment, if multiple views of a person are identified by the user, the Gaussian model may be a mixture model, where the components correspond roughly to the different views.

To train the model, video segments of a VIP walking through the camera areas are used. Each segment is labeled with the sequence of camera areas that the VIP walked through. Each of the individual camera area models are initialized using the features from regions where the probability of the camera area is high, and then embedded training based on the EM algorithm is used to refine the parameter values. For an example using the EM algorithm with an HMM, see Larry Rabiner, "A tutorial on Hidden Markov Models and selected applications in speech recognition," *Proc. IEEE* 77(2): pp. 257-286, 1989.

To identify the best camera for viewing, Viterbi decoding is used to determine the best path through the set of states representing the camera areas. The output of the Viterbi decoding is a sequence of camera areas which can be directly mapped to the best camera to use at each time. For example, if the camera area Hall3c 310 is in the sequence, then the camera for Hall3 220 would be selected.

In some embodiments, object-based changes in features that are more traditionally used in tracking are included. The velocity of a region in a camera area, or the change in velocity between the best candidate VIP at a previous time and the current time, are useful features for some embodiments. This information can be represented in several ways. One embodiment expands the feature vector to include the velocity feature and increase the number of nodes so that the extra nodes provide constraints on the velocity. In one embodiment, the extra nodes are placed between the camera area nodes. In an alternative embodiment, each camera area node is split into two or more nodes to represent the different directions one can walk in the hot spot.

Another alternative embodiment, that is more costly than using the Viterbi decoding, computes the transition probabilities on the fly. The transition probabilities are computed as a function of the similarity of the velocity of the best region in the previous node and the velocity of the best region in the current node. That is, the HMM transition $a_{ij}$ from state i to state j would be replaced with $f(v_j(t) - v_i(t-1))$, where $v_j(t)$ is the velocity of the best matching region in state j at time t, and $f$ is some function, such as a sigmoid function, relating the velocity difference to a transition probability. In some embodiments, the transition probabilities are fixed as is commonly done in HMMs, and then uniform transition probabilities may be assumed, since the observation probabilities usually dominate the transition probabilities and the amount of training data for the transitions may not be adequate to ensure a good estimate.

One embodiment may be implemented using a conventional general purpose or a specialized digital computer or microprocessor(s) programmed according to the teachings of the present disclosure, as will be apparent to those skilled in the computer art. Appropriate software coding can readily be prepared by skilled programmers based on the teachings of the present disclosure, as will be apparent to those skilled in the software art. The invention may also be implemented by the preparation of integrated circuits or by interconnecting an appropriate network of conventional component circuits, as will be readily apparent to those skilled in the art.

One embodiment includes a computer program product which is a storage medium (media) having instructions stored thereon/in which can be used to program a computer to perform any of the features present herein. The storage medium can include, but is not limited to, any type of disk including floppy disks, optical discs, DVD, CD-ROMs, micro drive, and magneto-optical disks, ROMs, RAMs, EPROMs, EEPROMs, DRAMs, flash memory of media or device suitable for storing instructions and/or data stored on any one of the computer readable medium (media). The present invention can include software for controlling both the hardware of the general purpose/specialized computer or microprocessor, and for enabling the computer or microprocessor to interact with a human user or other mechanism utilizing the results of the present invention. Such software may include, but is not limited to, device drivers, operating systems, execution environments/containers, and user applications.

Embodiments of the present invention can include a computer-implemented method for transmitting code which can be executed at a computer to perform any of the processes of embodiments of the present invention. The transmitting can include transfer through any portion of a network, such as the Internet; through wires, the atmosphere or space; or any other type of transmission. The transmitting can include initiating a transmission of code, or causing the code to pass into any region or country from another region or country. For example, transmitting includes causing the transfer of code through a portion of a network as a result of previously addressing and sending data including the code to a user. A transmission to a user can include any transmission received by the user in any region or country, regardless of the location from which the transmission is sent.

Embodiments of the present invention can include a signal-containing code which can be executed at a computer to perform any of the processes of embodiments of the present invention. The signal can be transmitted through a network, such as the Internet; through wires, the atmosphere or space; or any other type of transmission. The entire signal need not be in transit at the same time. The signal can extend in time over the period of its transfer. The signal is not to be considered as a snapshot of what is currently in transit.

The foregoing description of embodiments of the present invention has been provided for the purposes of illustration and description. It is not intended to be exhaustive or to limit the invention to the precise forms disclosed. Many modifications and variations will be apparent to one of ordinary skill in the relevant arts. For example, steps performed in the embodiments of the invention disclosed can be performed in alternate orders, certain steps can be omitted, and additional steps can be added. The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the claims and their equivalents.

What is claimed is:

1. An integrated method for modeling object tracking handoff between cameras, comprising, at a computer system with one or more processors and memory:
    creating a representation of allowable movement of an object within a floor layout that includes one or more rooms and one or more halls, wherein the movement is monitored by a plurality of cameras, wherein:
    the representation is modeled as a set of states in a Hidden Markov Model (HMM) including a first state, a second state, and a third state;
    the first state corresponds to a first camera area that represents at least a portion of a field of view of a first camera in the floor layout; and
    the second state corresponds to a first blind subregion of the floor layout that is not in a field of view of any of the plurality of cameras;
    a third state that corresponds to a second blind subregion of the floor layout that is not in the field of view of any of the plurality of cameras, wherein the second blind subregion is different from the first blind subregion; and
    training the HMM using video of activity in the fields of view of the cameras, wherein training the HMM includes determining a respective transition probability corresponding to movement of an object between the first camera area the first blind subregion and the second blind sub-region.

2. The method of claim 1, further comprising:
    selecting a respective object to be tracked; and
    identifying a best camera area for tracking the respective object, wherein the best camera area is determined based at least in part on the respective transition probability.

3. The method of claim 2, further comprising using similarity of object appearance as a feature for tracking the respective object in addition to the HMM.

4. The method of claim 2, further comprising using overlap of a region outlining the object with respective camera areas as a feature for tracking the respective object in addition to the HMM.

5. The method of claim 1, wherein Viterbi decoding is used to determine the best path between the set of states in the HMM.

6. The method of claim 1, wherein the HMM provides a formal framework for specifying allowable movement between views from the plurality of cameras.

7. The method of claim 1, wherein the first camera area includes a portion of the field of view of the first camera where an object can appear in or disappear from the field of view of the first camera.

8. The method of claim 7, wherein:
    the set of states in the HMM include a third state that corresponds to a second camera area that represents at least a portion of a field of view of a second camera in the floor layout;
    training the HMM includes determining a respective transition probability corresponding to movement of an object between the first camera area and the second camera area; and
    the second camera area includes a portion of the field of view of the second camera where an object can appear in or disappear from the field of view of the second camera.

9. The method of claim 8, wherein the field of view of the first camera is distinct from the field of view of the second camera.

10. The method of claim 8, wherein the HMM does not include pixel-based correspondence points between the first camera area and the second camera area.

11. The method of claim 1, wherein change in velocity of the respective person is incorporated into the HMM.

12. The method of claim 1, wherein the HMM includes a plurality of states corresponding the first camera area, including a state representing a first direction that an object can move in the first camera area and a state representing a second direction, distinct from the first direction, that an object can move in the first camera area.

13. The method of claim 1, wherein:
   the set of states in the HMM include a third state that corresponds to a second camera area that represents at least a portion of a field of view of a second camera in the floor layout;
   training the HMM includes determining a respective transition probability corresponding to movement of an object between the first camera area and the second camera area; and
   the method further comprises, after training the HMM:
      in accordance with detection of a respective object in the first camera area, determining that the second camera area is a best camera area for tracking the respective object; and
      after determining that the second camera area is a best camera area for tracking the respective object handing off tracking of the respective object to the second camera area.

14. The method of claim 1, wherein the first blind subregion is a room in the floor layout.

15. The method of claim 1, wherein the first blind subregion is a mode of transportation between floors of the floor layout.

16. A non-transitory computer readable storage medium storing one or more programs, the one or more programs comprising instructions, which when executed by a computer system with one or more processors, cause the computer system to:
   create a representation of allowable movement of an object within a floor layout that includes one or more rooms and one or more halls, wherein the movement is monitored by a plurality of cameras, wherein:
   the representation is modeled as a set of states in a Hidden Markov Model (HMM) including a first state, a second state, and a third state;
   the first state corresponds to a first camera area that represents at least a portion of a field of view of a first camera in the floor layout; and
   the second state corresponds to a first blind subregion of the floor layout that is not in a field of view of any of the plurality of cameras;
   a third state that corresponds to a second blind subregion of the floor layout that is not in the field of view of any of the plurality of cameras, wherein the second blind subregion is different from the first blind subregion; and
   train the HMM using video of activity in the fields of view of the cameras, wherein training the HMM includes determining a respective transition probability corresponding to movement of an object between the first camera area, the first blind subregion, and the second blind sub-region.

17. The computer readable storage medium of claim 16, wherein Viterbi decoding is used to determine the best path between the set of states in the HMM.

18. The computer readable storage medium of claim 16, wherein the HMM provides a formal framework for specifying allowable movement between views from the plurality of cameras.

19. The computer readable storage medium of claim 16, further comprising instructions to:
   select a respective object to be tracked; and
   identify a best camera area for tracking the respective object, wherein the best camera area is determined based at least in part on the respective transition probability.

20. The computer readable storage medium of claim 16, wherein:
   the set of states in the HMM include a third state that corresponds to a second camera area that represents at least a portion of a field of view of a second camera in the floor layout; and
   training the HMM includes determining a respective transition probability corresponding to movement of an object between the first camera area and the second camera area.

21. The computer readable storage medium of claim 16, wherein the first blind subregion is a room in the floor layout.

22. The computer readable storage medium of claim 16, wherein the first blind subregion is a mode of transportation between floors of the floor layout.

23. A computer system, comprising:
   one or more processors;
   memory; and
   one or more programs, wherein the one or more programs are stored in the memory and configured to be executed by the one or more processors, the one or more programs including instructions for:
   creating a representation of allowable movement of an object within a floor layout that includes one or more rooms and one or more halls, wherein the movement is monitored by a plurality of cameras, wherein:
   the representation is modeled as a set of states in a Hidden Markov Model (HMM) including a first state, a second state, and a third state;
   the first state corresponds to a first camera area that represents at least a portion of a field of view of a first camera in the floor layout; and
   the second state corresponds to a first blind subregion of the floor layout that is not in a field of view of any of the plurality of cameras;
   a third state that corresponds to a second blind subregion of the floor layout that is not in the field of view of any of the plurality of cameras, wherein the second blind subregion is different from the first blind subregion; and
   training the HMM using video of activity in the fields of view of the cameras, wherein training the HMM includes determining a respective transition probability corresponding to movement of an object between the first camera area the first blind subregion, and the second blind sub-region.

24. The system of claim 23, further comprising instructions for:
   selecting a respective object to be tracked; and
   identifying a best camera area for tracking the respective object, wherein the best camera area is determined based at least in part on the respective transition probability.

25. The system of claim 23, wherein:
   the set of states in the HMM include a third state that corresponds to a second camera area that represents at least a portion of a field of view of a second camera in the floor layout; and training the HMM includes determining a respective transition probability corresponding to movement of an object between the first camera area and the second camera area.

26. The system of claim 23, wherein the first blind subregion is a room in the floor layout.

27. The system of claim 23, wherein the first blind subregion is a mode of transportation between floors of the floor layout.

* * * * *